(12) United States Patent
Thompson et al.

(10) Patent No.: US 11,807,111 B2
(45) Date of Patent: Nov. 7, 2023

(54) ELECTRIC DRIVE SYSTEM FOR A MOWER

(71) Applicant: Parker-Hannifin Corporation, Cleveland, OH (US)

(72) Inventors: Randall D. Thompson, Lancaster, SC (US); Steven R. Huard, Greenville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 17/865,672

(22) Filed: Jul. 15, 2022

(65) Prior Publication Data

US 2022/0363142 A1 Nov. 17, 2022

Related U.S. Application Data

(63) Continuation of application No. 16/861,382, filed on Apr. 29, 2020, now Pat. No. 11,427,091.

(60) Provisional application No. 62/839,876, filed on Apr. 29, 2019.

(51) Int. Cl.
*B60L 50/14* (2019.01)
*A01D 34/00* (2006.01)
*A01D 101/00* (2006.01)

(52) U.S. Cl.
CPC .......... *B60L 50/14* (2019.02); *A01D 34/006* (2013.01); *A01D 2101/00* (2013.01); *B60L 2200/40* (2013.01); *B60L 2210/40* (2013.01)

(58) Field of Classification Search
CPC .. B60L 50/14; B60L 2200/40; B60L 2210/40; A01D 34/006; A01D 2101/00
USPC .................................................. 307/9.1, 10.1
See application file for complete search history.

(56) References Cited

U.S. PATENT DOCUMENTS

| | | | |
|---|---|---|---|
| 5,127,085 A * | 6/1992 | Becker | H02H 7/1216 318/434 |
| 6,604,348 B2 | 8/2003 | Hunt | |
| 6,857,253 B2 | 2/2005 | Reimers et al. | |
| 7,610,975 B1 | 11/2009 | Gust et al. | |
| 7,677,371 B2 | 3/2010 | Dong et al. | |
| 7,728,534 B2 | 6/2010 | Lucas et al. | |
| 8,191,342 B2 | 6/2012 | Ishii et al. | |
| 8,579,055 B2 | 11/2013 | Sasahara et al. | |
| 8,657,041 B2 | 2/2014 | Ishii et al. | |
| 8,964,429 B2 | 2/2015 | Horie et al. | |
| 9,398,743 B1 | 7/2016 | Fox et al. | |
| 9,599,170 B1 | 3/2017 | Hauser et al. | |
| 9,635,806 B2 | 5/2017 | Waitt et al. | |
| 9,780,702 B2 | 10/2017 | Li et al. | |
| 9,828,025 B1 | 11/2017 | Hauser et al. | |
| 9,908,407 B1 | 3/2018 | Bennett et al. | |
| 10,058,031 B1 | 8/2018 | Brown et al. | |
| 2008/0007190 A1 | 1/2008 | Kunii et al. | |

* cited by examiner

*Primary Examiner* — Hal Kaplan
(74) *Attorney, Agent, or Firm* — McDonnell Boehnen Hulbert & Berghoff LLP

(57) ABSTRACT

An example vehicle comprises: (i) a source of direct current power, (ii) at least one electronically-commutated electric motor configured to drive a wheel of the vehicle, and (iii) a voltage bus connecting the source of direct current power with the electronically-commutated electric motor.

20 Claims, 11 Drawing Sheets

ELECTRIC DRIVE SYSTEM FOR A MOWER

CROSS REFERENCE TO RELATED APPLICATION

The present application is a continuation of U.S. patent application Ser. No. 16/861,382, filed on Apr. 29, 2020, and entitled "Electric Drive System for a Mower," which claims priority to U.S. Provisional Patent Application No. 62/839,876, filed on Apr. 29, 2019, and entitled "Electric Drive System for a Mower," the entire contents of all of which are herein incorporated by reference as if fully set forth in this description.

TECHNICAL FIELD

This invention relates to a drive system for use in vehicles such as lawn and garden tractors, stand-on mowers, walk-behind snow throwers and mowers, and the like, including both single axle drives and dual axle drives for use in zero-turn applications.

BACKGROUND

Conventional mowers are typically driven by dual hydrostatic transmissions, one hydrostatic transmission for each wheel, powered by belts and pulleys from an internal combustion engine. This configuration is notoriously noisy and is highly dependent on engine speed and power split between the hydrostatic transmissions. Particularly, both the traction speed and the blade speed of the mower are dependent on the engine's speed. With such configuration, when the mower is slowed down by throttling back and engine, the speed of the blade is also undesirably reduced.

It may thus be desirable to have a driving system that decouples the rotational speed of wheels of the traction system from the engine speed. It is with respect to these and other considerations that the disclosure made herein is presented.

SUMMARY

The present disclosure describes implementations that relate to methods and systems related to an electric drive system for a mower.

In an example implementation, the present disclosure describes a vehicle. The vehicle comprises: (i) source of direct current (DC) power; (ii) a DC voltage bus coupled to the source of DC power and configured to transmit DC voltage generated by the source of DC power; (iii) a power converter coupled to the DC voltage bus and configured to convert the DC voltage to three-phase electric power; (iv) an electric motor coupled to the power converter and configured to receive the three-phase electric power, thereby generating a torque at an output shaft of the electric motor; and (v) a wheel coupled to the output shaft of the electric motor and configured to be driven by the torque generated at the output shaft of the electric motor.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

In conventional mowers, the speed of the mowing deck is coupled to the input speed of the hydrostatic transmissions. With such configuration, slowing down the mower to obtain a slower traction speed by throttling back on the engine forces the reduction of speed of the cutting blade of the mowing deck. It may thus be desirable to decouple, or render independent, the traction system from the engine speed.

Disclosed herein are systems and methods for driving systems that decouple speed of the traction system from the engine and cutting blade speeds. Particularly, disclosed herein are driving systems involving a single electric motor configured to drive dual power transmissions with or without gear reduction. The disclosed systems enable individual or independent powering of separate wheels of a traction system from rest to full forward back to rest and to full reverse for use in utility vehicles such as zero-turn mowers. With this configuration, the engine speed can remain high for the cutting blade while the electric motor speed can be independently reduced for fine control of the traction system, for example.

Figure 1:
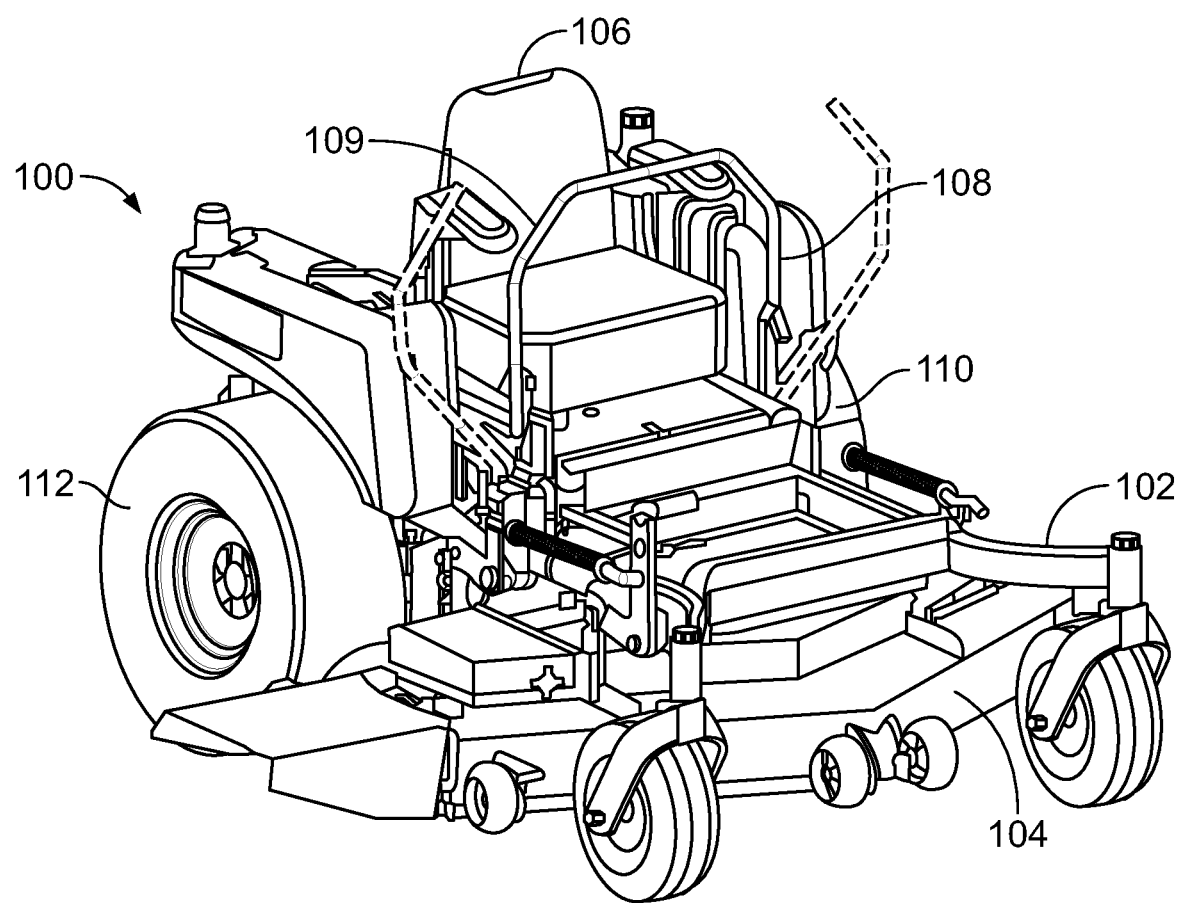
FIG. 1 illustrates a perspective view of a mower, in accordance with an example implementation.

FIG. 1 illustrates a perspective view of a mower 100, in accordance with an example implementation. The mower 100 can be, for example, zero-turn-radius mower (e.g., a lawn mower with a turning radius that is effectively zero).

The mower 100 includes a frame 102. The mower 100 also includes a mower deck 104 supported by the frame 102 for mowing grass, for example. The mower 100 further includes an operator seat 106 and steering control levers 108, 109 for operating the mower 100.

In examples, a rear mounted engine (not shown) can be mounted to the frame 102 behind the operator seat 106. The engine can, for example, be an internal combustion engine configured to provide power to a drive system coupled to respective rear wheels such as left wheel 110 and right wheel 112 that drive the mower 100.

Each wheel of the wheels 110, 112 can be independently controlled via respective transmissions as described in details below, and the steering control levers 108, 109 can be configured to control speed and direction of the wheels 110, 112 via actuating the respective transmissions. Thus, the drive system can be controlled by an operator to independently drive the wheels 110, 112 to propel the mower 100. The configuration of the mower 100 is an example configuration and it should be understood that other mower configurations and vehicle types can be used in accordance with the drive systems disclosed herein.

Figure 2:
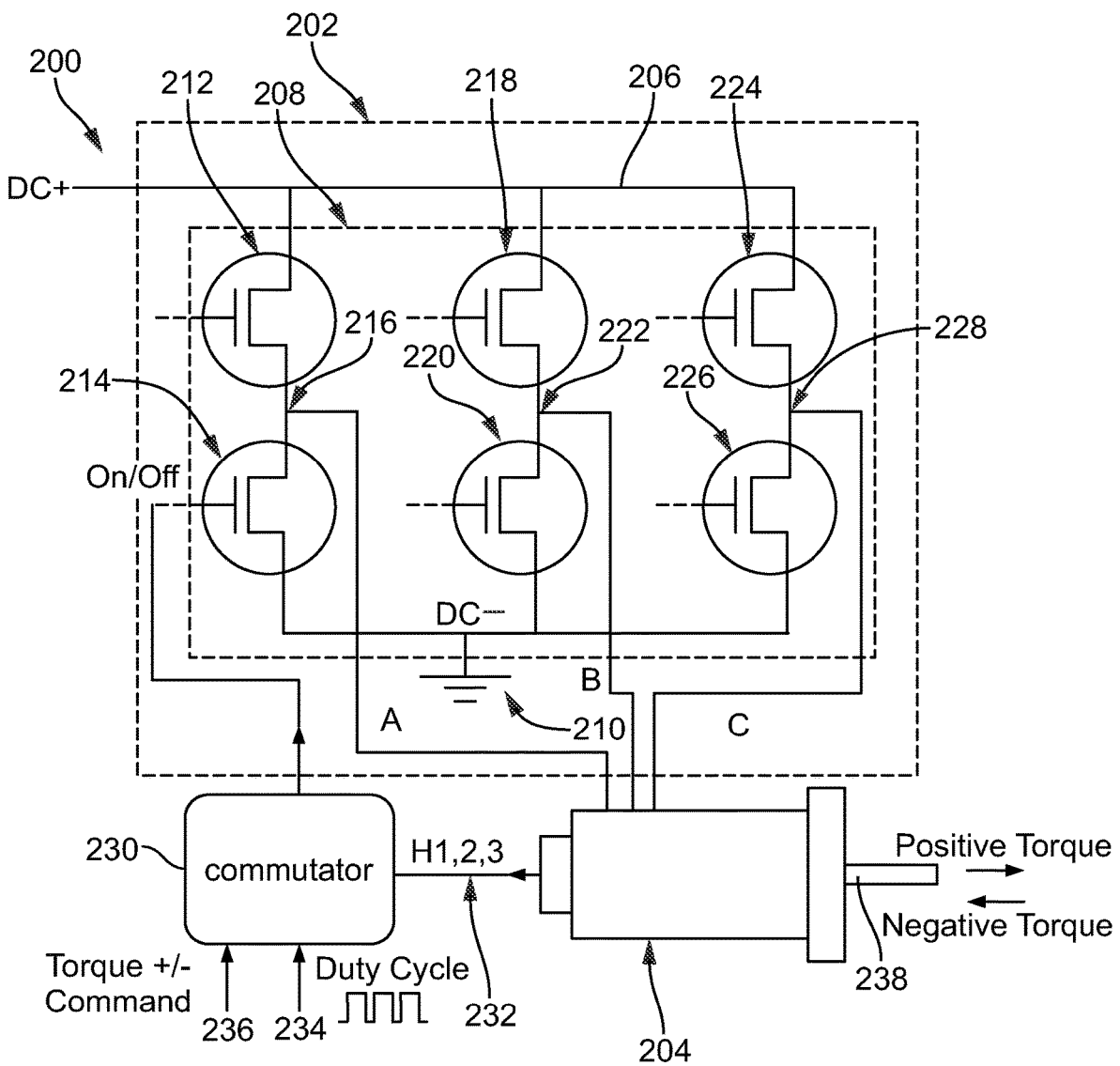
FIG. 2 illustrates a drive system having a power converter and an electric motor, in accordance with an example implementation.

FIG. 2 illustrates a drive system 200 having a power converter 202 and an electric motor 204, in accordance with an example implementation. Example components of the power converter 202 are illustrated as being included in a dashed line in FIG. 2. The electric motor 204 can be configured as a three-phase electronically commutated motor. For example, the electric motor 204 can be a brushless direct current (DC) motor.

The power converter 202 includes a DC voltage bus 206 configured to be powered by, for example, an electric generator as described below. The power converter 202 further includes a semiconductor switching matrix 208 disposed between the DC voltage bus 206 and electric ground 210 (e.g., earth ground or chassis ground of the mower 100). With this configuration, the DC voltage bus 206 operates as a DC+ terminal for the semiconductor switching matrix 208 and the electric ground 210 operates as a DC− signal for the semiconductor switching matrix 208.

The semiconductor switching matrix 208 can include any arrangement of semiconductor switching devices that can support DC to three-phase power conversion. As depicted in the example implementation of FIG. 2, the semiconductor switching matrix 208 comprises three-phase, with bridge elements electrically coupled to the input terminals DC+ and DC− and connected to the output terminals A, B, and C of the semiconductor switching matrix 208.

The semiconductor switching matrix 208 can include a transistor 212 (e.g., an Insulated Gate Bipolar Transistor) connected to a transistor 214 at junction point 216, which is connected to the output terminal A. The semiconductor switching matrix 208 can also include a transistor 218 connected to a transistor 220 at junction point 222, which is connected to the output terminal B. The semiconductor switching matrix 208 can further include a transistor 224 connected to transistor 226 at junction point 228, which is connected to the output terminal C. The topology used in FIG. 2 is an example for illustration only and is not meant to be limiting and other topologies can be used. For instance, other types of switches or transistors can be used rather than IGBTs, and other topologies (e.g., three-phase topologies with half bridge elements) can be used.

The drive system 200 can include a commutator 230 configured to control the power converter 202. The commutator 230 is communicatively coupled, e.g., via a wired communication bus, to the switching elements (i.e., the transistors 212-214, 218-220, and 224-226) of the semiconductor switch matrix 208. The commutator 230 is shown in FIG. 2 connected only to the transistor 214 to reduce visual clutter in the drawing, but it should be understood that the commutator 230 is also connected to the other transistors 212, 218-220, and 224-226.

The commutator 230 is configured to activate and deactivate the transistors 212-214, 218-220, and 224-226 at particular times to generate alternating current (AC) voltage waveforms at output terminals A, B, and C of the semiconductor switching matrix 208. As such, the voltage waveforms at the output terminals A, B, and C are pulse width modulated and swing between voltage potential DC− and voltage potential DC+.

In examples, the commutator 230 can be configured as a digital controller including one or more processors or microprocessors and may include data storage (e.g., memory, transitory computer-readable medium, non-transitory computer-readable medium, etc.). The data storage may have stored thereon instructions that, when executed by the one or more processors of the commutator 230, cause the commutator 230 to perform the operations described herein. In other examples the commutator 230 can include a control circuit configured to control the switching action (i.e., activation and deactivation) of switching elements (e.g., the transistors 212-214, 218-220, and 224-226) of the semiconductor switch matrix 208. In these examples, such control circuit can include AC and DC voltage sensors, AC current sensors, temperature sensors, fault sensors, state machine computing device, etc.

As shown in FIG. 2, the commutator 230 is configured to receive a three-phase commutation feedback signal 232 from the electric motor 204. The commutator 230 can include logic or instructions to convert the three-phase commutation feedback signal 232 into respective activation signals comprising on/off commands to the transistors 212-214, 218-220, and 224-226. As such, the commutator 230 converts the three-phase commutation feedback signal 232 from the electric motor 204 into an excitation pattern for the transistors 212-214, 218-220, and 224-226 to generate the pulse width modulated waveforms at the output terminals A, B, and C.

In examples, the commutator 230 can be configured to receive two additional signals that are fed thereto. A first signal 234 can be indicate a desired or commanded duty cycle of the pulse width modulation (PWM) signal activating and deactivating the transistors 212-214, 218-220, and 224-226 and permit throttling or controlling the torque output of the electric motor 204. A duty cycle or power cycle can represent the fraction of one period in which any of the transistors 212-214, 218-220, and 224-226 is active.

A second signal 236 received by the commutator 230 can be a torque command, which is desired to be output by the electric motor 204. The second signal 236 can include a magnitude and direction (positive or negative) of the desired torque. In examples, the first signal 234 (the duty cycle) and the second signal 236 (the torque command) can be combined into one single command.

With the configuration of FIG. 2, torque output at an output shaft 238 of the electric motor 204 can be controlled in two independent methods. The first method is with the voltage magnitude or voltage level on the DC voltage bus 206. As the voltage level at the DC voltage bus 206 increases, the torque output at the output shaft 238, and thus the speed of the electric motor 204, can increase. The voltage level at the DC voltage bus 206 can also control the maximum speed of the electric motor 204.

The second method to control the torque output of the electric motor 204 involves controlling the duty cycle (the first signal 234), which determines PWM percent command (e.g., amount of time the transistors 212-214, 218-220, and 224-226 are activated or turned on) sent to the commutator 230. By adjusting the percentage of time the transistors 212-214, 218-220, and 224-226 are in an "on" state, the torque from the electric motor 204 can be further fine-tuned or adjusted in addition to controlling the torque with the voltage level of the DC voltage bus 206. Under some operating conditions, fine tuning of the torque output might not be required, and in these operating conditions the duty cycle provided via the first signal 234 can be set to 100%, while controlling the voltage level at the DC voltage bus 206 to control the level of torque at the output shaft 238.

When power is being output from the output shaft 238 of the electric motor to drive one of the wheels 110, 112 of the mower 100, torque is being applied to the respective wheel and the torque can be referred to as a positive torque (i.e., the second signal 236 comprises a positive torque command). The torque command delivered via the second signal 236 can be set to a negative torque to slow down or reverse the rotational direction of the wheel. In the latter case the electric motor 204 can operate in a regenerative mode (e.g., the electric motor 204 can operate as an electric generator converting mechanical motion into electric power).

Power can be provided to the power converter 202 to generate a voltage on the DC voltage bus 206 and operate the electric motor 204 in various ways. For example, the mower 100 can include an engine and an electric generator coupled to the engine. An output shaft of the engine is coupled to the input shaft of the electric generator, such that as the engine is running, the electric generator generates electric power. The electric power generated can be in the form of a three-phase power that can then be converted to a DC voltage to be provided to the DC voltage bus 206.

Figure 3:
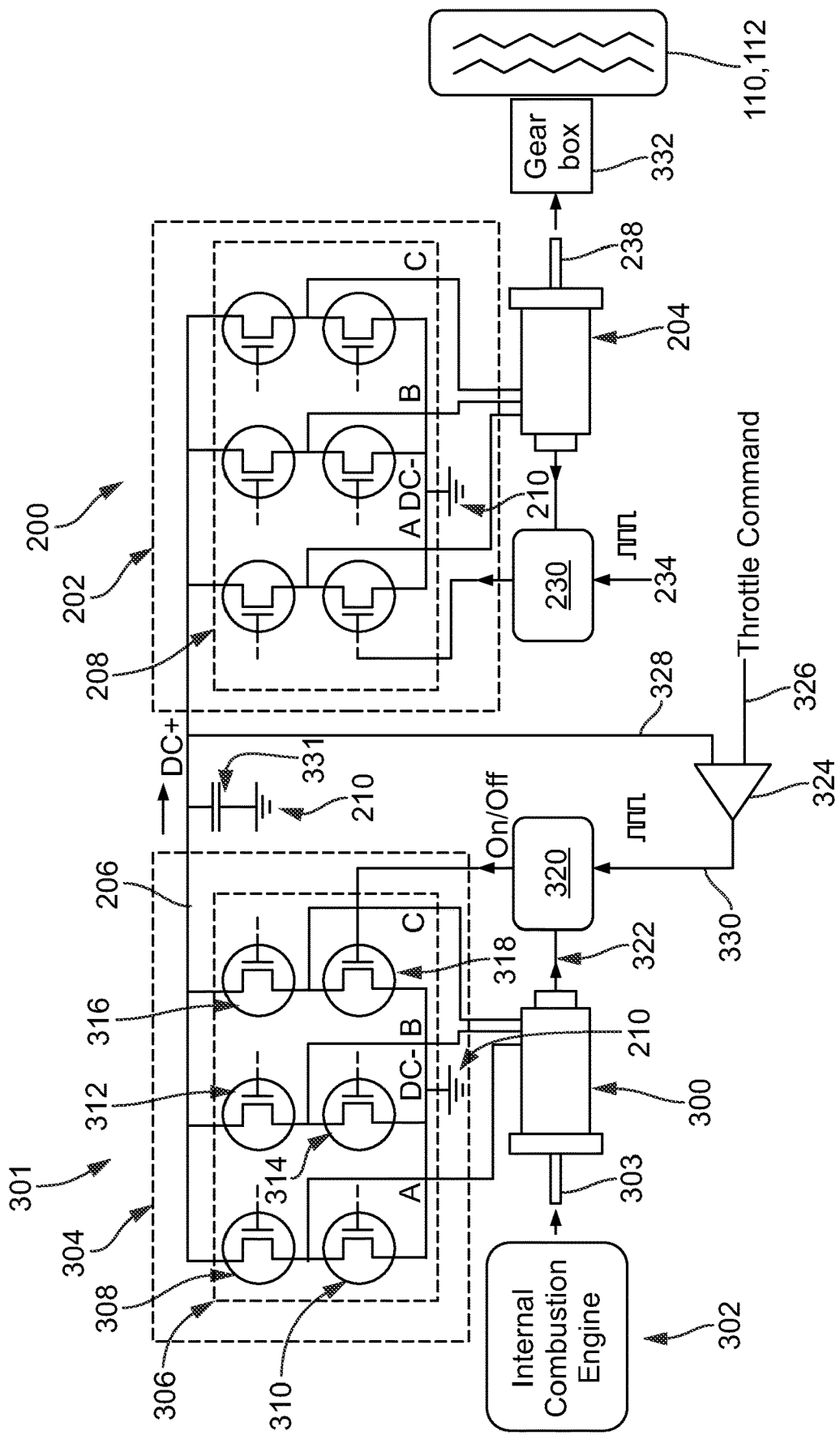
FIG. 3 illustrates a control system including an electric generator coupled to an engine of a mower to power the drive system, in accordance with an example implementation.

FIG. 3 illustrates a control system 301 including an electric generator 300 coupled to an engine 302 of the mower 100 to power the drive system 200, in accordance with an example implementation. The engine 302 can, for example, be an internal combustion engine that is gas or diesel powered. An output shaft of the engine 302 can be coupled (e.g., directly or through a gear box) to an input shaft 303 of the electric generator 300. Thus, as the engine 302 is turned on, the electric generator 300 generates three-phase power.

To convert the three-phase power of the electric generator 300 to a DC voltage, the mower 100 can include a power converter 304. The power converter 304 is electrically coupled to the DC voltage bus 206 and the electric ground 210.

The power converter 304 further includes a semiconductor switching matrix 306 that is disposed between the DC voltage bus 206 and the electric ground 210. The semiconductor switching matrix 306 can include any arrangement of semiconductor switching devices that can support three-phase to DC power conversion. Voltage waveforms received from the electric generator 300 at input terminals A, B, and C of the semiconductor switching matrix 306 are pulse width modulated to generate or output a DC voltage on the DC voltage bus 206.

As depicted in the example implementation of FIG. 3, the semiconductor switching matrix 306 is similar to the semiconductor switching matrix 208 and comprises three-phase bridge, with bridge elements electrically coupled to the electric ground 210 and the DC voltage bus 206 (e.g., output terminals DC+ and DC−) and connected to the input terminals A, B, and C of the semiconductor switching matrix 306.

For example, the semiconductor switching matrix 306 can include a transistor 308 (e.g., an Insulated Gate Bipolar Transistor) connected to a transistor 310 at a junction point connected to the input terminal A from the electric generator 300. The semiconductor switching matrix 306 can also include a transistor 312 connected to a transistor 314 at a junction point connected to the input terminal B from the electric generator 300. The semiconductor switching matrix 306 can further include a transistor 316 connected to transistor 318 at a junction point connected to the input terminal C from the electric generator 300. The topology used in FIG. 3 is an example for illustration only and is not meant to be limiting and other topologies can be used. For instance, other types of switches or transistors can be used rather than IGBTs, and other topologies (e.g., three-phase topologies with half bridge elements) can be used.

The control system 301 can include a commutator 320 that is similar to the commutator 230 and is configured to control the power converter 304. The commutator 320 is communicatively coupled, e.g., via a wired communication bus, to the switching elements (i.e., the transistors 308-318) of the semiconductor switch matrix 306. The commutator 320 is shown in FIG. 3 connected only to the transistor 318 to reduce visual clutter in the drawing, but it should be understood that the commutator 320 is also connected to the other transistors 308-316.

The commutator 320 is configured to activate and deactivate the transistors 308-318 (e.g., turn them on and off) at particular times and at a particular PWM frequency to convert the AC waveforms received at the AC input terminals A, B, and C from the electric generator 300 and generate a DC voltage at the DC voltage bus 206. In other words, the commutator 320 is configured to generate respective activation signals comprising on/off commands at the particular PWM frequency for the transistors 308-318 to generate a DC voltage.

In examples, the commutator 320 can be configured as a digital controller including one or more processors or microprocessors and may include data storage (e.g., memory, transitory computer-readable medium, non-transitory computer-readable medium, etc.). The data storage may have stored thereon instructions that, when executed by the one or more processors of the commutator 320, cause the commutator 320 to perform the operations described herein. In other examples the commutator 320 can include a control circuit configured to control the switching action (i.e., activation and deactivation) of switching elements (e.g., the transistors 308-318) of the semiconductor switch matrix 306.

As shown in FIG. 3, the commutator 320 can be configured to receive a three-phase commutation feedback signal 322 from the electric generator 300. The commutator 320 can include logic or instructions to convert the three-phase commutation feedback signal 322 into on/off commands to the transistors 308-318 to generate a DC voltage. In other words, the commutator 320 converts the three-phase commutation feedback signal 322 from the electric generator 300 into an excitation pattern for the transistors 308-318 to generate the DC voltage at the DC voltage bus 206.

The control system 301 can include an error signal generating module, such as an amplifier or a comparator 324, configured to receive a throttle command signal 326 and a DC voltage bus feedback signal 328. The throttle command signal 326 can be a voltage signal indicative of a desired mower or wheel speed commanded by a user of the mower 100, e.g., via a joystick or other input device. The DC voltage bus feedback signal 328 is a feedback signal indicative of voltage level of the DC voltage bus 206.

The comparator 324 compares the throttle command signal 326 and the DC voltage bus feedback signal 328 and generates an error signal 330 indicative of discrepancy between the throttle command signal 326 and the DC voltage bus feedback signal 328. The error signal 330 is then input into the commutator 320 as a commanded duty cycle for the transistors 308-318 of the power converter 304. As a result, the commutator 320 controls the power converter 304 to generate a desired voltage level on the DC voltage bus 206 that can achieve the desired speed indicated by the throttle command signal 326. The DC voltage is then provided from the DC voltage bus 206 to the driving system 200 to drive the electric motor 204 as described above with respect to FIG. 2.

With this configuration, the throttle command signal 326 determines the voltage level (magnitude of voltage) of the DC voltage bus 206 by adjusting the PWM frequency applied to the output three-phase power of the electric generator 300. If the commanded speed indicated by the throttle command signal 326 increases, the voltage level of DC voltage bus 206 increases to meet the commanded speed, and vice versa.

In examples, the control system 301 can include a DC bus capacitor 331 that couples the DC voltage bus 206 to the electric ground 210. The DC bus capacitor 331 can be configured to provide low impedance at DC input terminals DC+ and DC− of the semiconductor switching matrix 208 at the PWM switching frequencies for the semiconductor switching matrix 208. The DC bus capacitor 331 can be configured to operator as an energy storage capacitor such that as the transistors 212-214, 218-220, and 224-226 are switched on, they draw current from the DC bus capacitor 331.

As depicted in FIG. 3, the electric motor 204 provides rotational power to a gear box 332 configured to reduce rotational speed of the output shaft 238 of the electric motor 204. In the example depicted in FIG. 3, one motor (e.g., the electric motor 204) delivers power to a single axle, which is mechanically coupled to one both of the wheels 110, 112. In this example, the first signal 234 (duty cycle) delivered to the commutator 230 can be set to 100%, and the speed of the electric motor 204 and the wheels 110, 112 can be controlled by the magnitude of voltage of the DC voltage bus 206. In other examples, it may be desirable to independently control traction of the wheels 110, 112. As such, it may be desirable to have two electric motors, one electric motor controlling each of the wheels 110, 112 independently.

Figure 4:
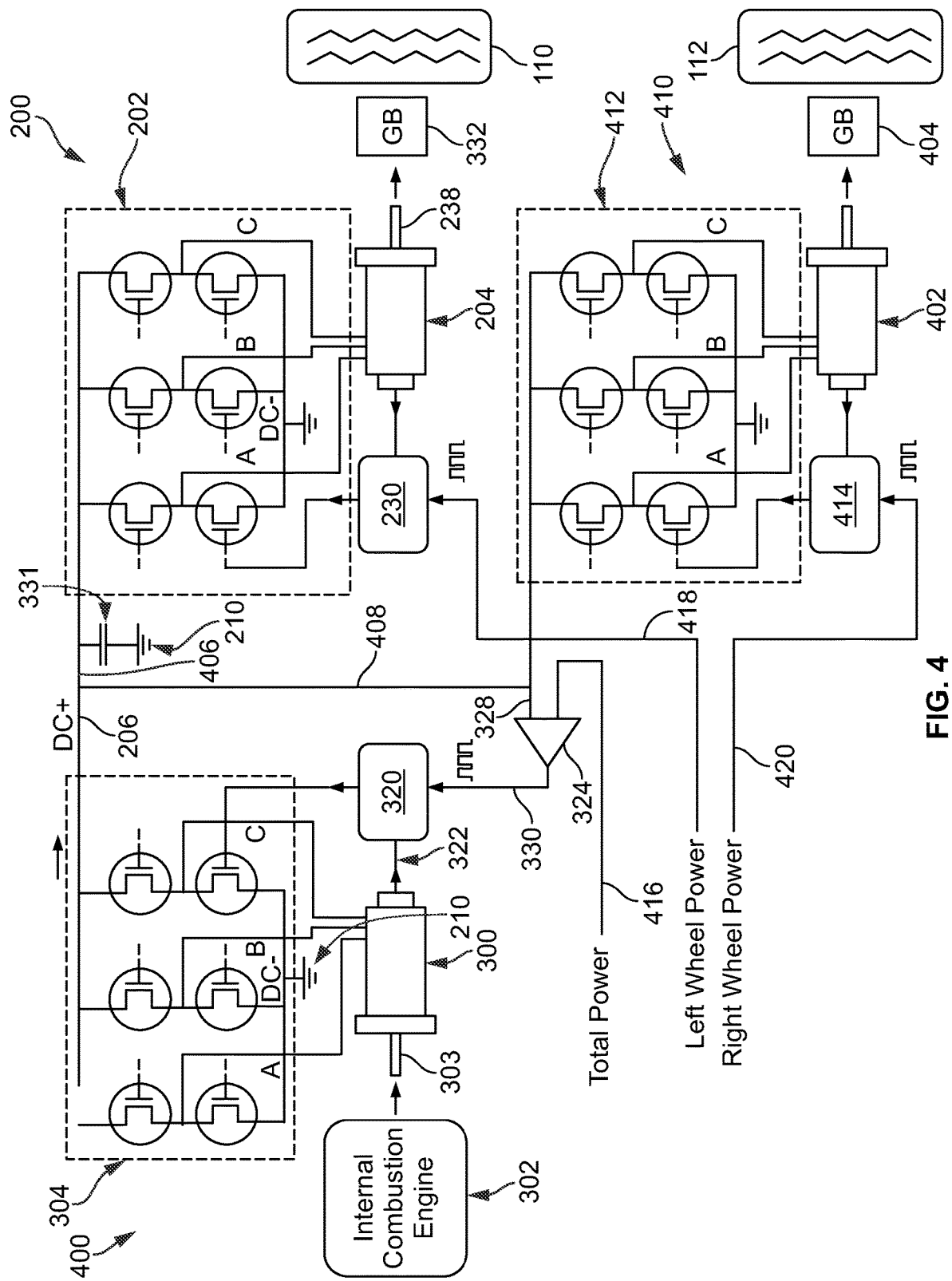
FIG. 4 illustrates a control system for multi motor traction control, in accordance with an example implementation.

FIG. 4 illustrates a control system 400 for multi motor traction control, in accordance with an example implementation. As shown in FIG. 4, the control system 400 can include the electric generator 300 and two traction motors: the electric motor 204 providing traction via the gear box 332 to the wheel 110, and an electric motor 402 providing traction via a gear box 404 to the wheel 112.

In particular, the DC voltage bus 206 branches into a first DC voltage bus 406 configured to provide electric power to the driving system 200 associated with the electric motor 204 and a second DC voltage bus 408 configured to provide electric power to a driving system 410 associated with the electric motor 402. Voltage level at the DC voltage buses 206, 406, and 408 is substantially the same.

The driving system 410 can be configured to be similar to the driving system 200. For example, the driving system 410 can have a power converter 412 and a commutator 414. The commutator 414 can be configured to be similar to the commutator 230. As such, the commutator 414 can be communicatively coupled, e.g., via a wired communication bus, to switching elements (i.e., transistors) of a respective semiconductor switch matrix (similar to the semiconductor switch matrix 208) of the power converter 412.

The commutator 414 is configured to activate and deactivate switching elements at a particular PWM frequency to generate voltage waveforms at the AC output terminals A, B, and C of the power converter 412. As such, the voltage waveforms at the output terminals A, B, and C are pulse width modulated and swing between voltage potential DC− and voltage potential DC+ provided to the second DC voltage bus 408. The voltage waveforms are provided to the electric motor 402 to drive the wheel 112.

With this configuration, the control system 400 is configured to enable delivering power independently to the wheels 110, 112. This configuration enables turning the mower 100 by causing an imbalance in the power provided to the wheel 110 compared to the power delivered to the wheel 112.

In an example, the power delivered to the wheels 110, 112 can be controlled by adjusting the voltage level of the DC voltage bus 206. In particular, an operator of the mower 100 can provide a left tire power command ($PC_{left}$) and a right tire power command ($PC_{right}$) (e.g., via the steering control levers 108, 109), and the voltage level of the DC voltage bus 206 can be adjusted based on absolute values of $PC_{left}$ and $PC_{right}$. In this case, the total power commanded can be determined as:

$$\text{Total Power Commanded} = \text{abs}(PC_{left}) + \text{abs}(PC_{right}) \quad (1)$$

The power delivered to the left wheel (e.g., the wheel 110) can be determined as equal to fifty percent of the total power plus the left tire power command $PC_{left}$ minus the right tire power command $PC_{right}$:

$$\text{Power to left wheel} = \frac{\text{Total Power}}{2} + \frac{(PC_{left} - PC_{right})}{2} \quad (2)$$

Similarly, the power delivered to the right wheel (e.g., the wheel 112) can be determined as equal to fifty percent of the total power plus the right tire power command minus the left tire power command:

$$\text{Power to right wheel} = \frac{\text{Total Power}}{2} + \frac{(PC_{right} - PC_{left})}{2} \quad (3)$$

The total power delivered is equal to (Power to the left wheel+Power to the right wheel).

The total power commanded determined by equation (1) can be input to the comparator 324 as total power commanded signal 416 to determine the error signal 330, which is then used to determine the voltage level of the DC voltage bus 206. Also, the power to the left wheel determined by equation (2) is provided as a left wheel input signal 418 to the commutator 230, whereas the power to the right wheel determined by equation (3) is provided as a right wheel input signal 420 to the commutator 320.

This way, different power levels can be respectively provided to the wheels 110, 112. Notably, with this configuration, the power consumed by the wheels 110, 112 can be equal to the power absorbed by the electric generator 300 from the engine 302, and therefore there is no need to store energy in a battery system, and the cost of the control system 400 can be less than the cost of a system having batteries.

To slow down the mower 100, regenerative braking can be used where rotational power of the wheel 110 and/or the wheel 112 can be converted into electric power absorbed by the power converter 304, the electric generator 300, and the engine 302. The configuration of the power converter 304 having the transistors 308-318 enables such regenerative mode of operation. However, to reduce the cost of the control system 400, passive rectification can be used.

Figure 5:
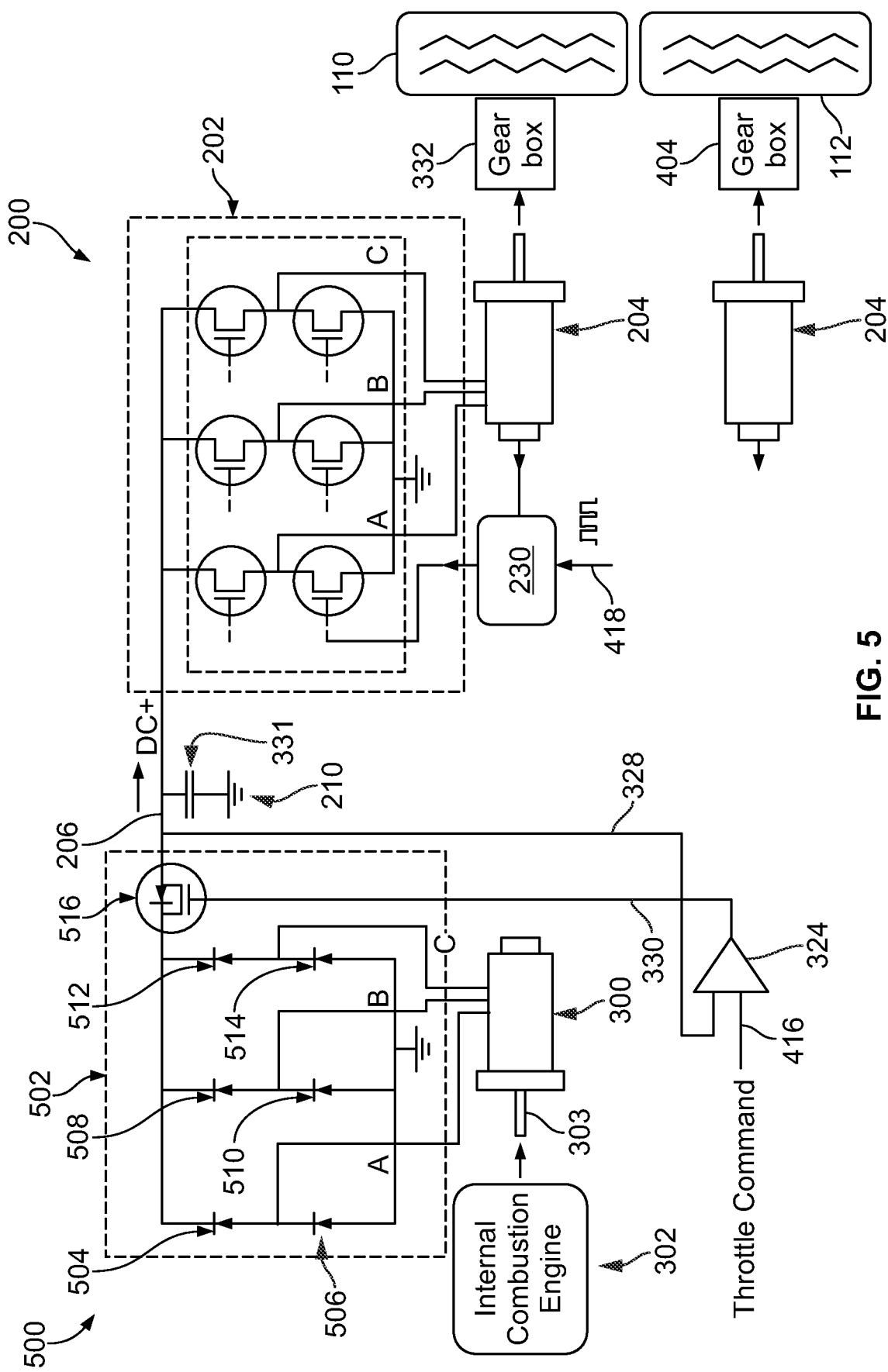
FIG. 5 illustrates a control system for multi motor traction control using passive rectification, in accordance with an example implementation.

FIG. 5 illustrates a control system 500 for multi motor traction control using passive rectification, in accordance with an example implementation. In FIG. 5, details of driving system 410 and the power converter 412 are not shown to reduce visual clutter in the drawings; however, it should be understood that the electric motor 402 in FIG. 5 is controlled via the components shown in FIG. 4.

FIG. 5 differs from the configuration of FIGS. 3-4 in that, rather than using the power converter 304 having the transistors 308-318 that are actively controlled by on/off signals from the commutator 320, in FIG. 5 a passive rectifier 502 comprising passive diodes is used. In particular, the passive rectifier 502 includes include a diode 504 connected to a diode 506 at a junction point connected to the input terminal A from the electric generator 300. The passive rectifier 502 can also include a diode 508 connected to a diode 510 at a junction point connected to the input terminal B from the electric generator 300. The passive rectifier 502 can further include a diode 512 connected to a diode 514 at a junction point connected to the input terminal C from the electric generator 300.

With the configuration of FIG. 5, the commutator 320 is not used as the diodes 504-514 are passive elements that do not operate based on an actuation signal; rather, they conduct current in one direction (asymmetric conductance) as they have low resistance in one direction, and high resistance in the other. With this configuration, the diodes 504-514 facilitate converting alternating current from the three-phase power provided by the electric generator 300, which periodically reverses direction, to DC current, which flows in one direction to the DC voltage bus 206.

The control system 500 can further include a transistor 516 disposed in the DC voltage bus 206. The transistor 516 is actuatable by the error signal 330, which is indicative of discrepancy between the total power commanded signal 416 and the DC voltage bus feedback signal 328. As such, rather than providing the error signal 330 to the commutator 320 as shown in FIG. 4, the error signal 330 is used to actuate the transistor 516 in FIG. 5 to control voltage level of the DC voltage bus 206.

With the control system 500, the engine 302 can be run at a small range of speed (corresponding to a desired speed of a cutting blade of the mower 100), and the power flows in one direction from the electric generator 300 to the electric motors 204, 402. Energy is not regenerated back to the electric generator 300 and the engine 302, and therefore the mower 100 can include mechanical brakes to slow the mower 100 when desired (e.g., when going downhill).

The systems shown in FIGS. 2-5 can include additional components and can be implemented with variations. For instance, a ground plain resistor network can be added to monitor the delivery and division of power to the wheels 110, 112. In another example, with respect to the configuration in FIG. 3, the electric motor 204 and the electric generator 300 can be operated with a synchronized PWM signal. As such, the relationship between throttle command and power is a squared function rather than a linear function. Also, the PWM signal can be coordinated so that voltage ripples at the DC voltage bus 206 can be reduced. In this case, the DC bus capacitor 331 can be sized so that the voltage ripple on the DC voltage bus 206 can be reduced.

In an example, the PWM "on" or active period of time for transistors of the power converters 202, 412 controlling the wheels 110, 112 can be coordinated so that the transistors of the power converter 202 are not "on" at the same time the transistors of the power converter 412 are "on." Rather, the switching frequency from the commutators 230, 414 can be configured so that transistors of one power converter turns "on," while the other is "off," and vice versa. In another example, an additional transistor can be used to block the voltage between the electric generator 300 and the power converters 202, 412 so that the engine 302 can be idled at a high speed, while the voltage provided to the electric motors 204, 402 is zero.

As mentioned above, gear boxes, such as the gear boxes 332, 404, can be used to respectively couple the electric motors 204, 402 to the wheels 110, 112. Several types of gear boxes can be used and different mechanical drive or propulsion system configurations can be implemented with the control systems described above.

Figure 6:
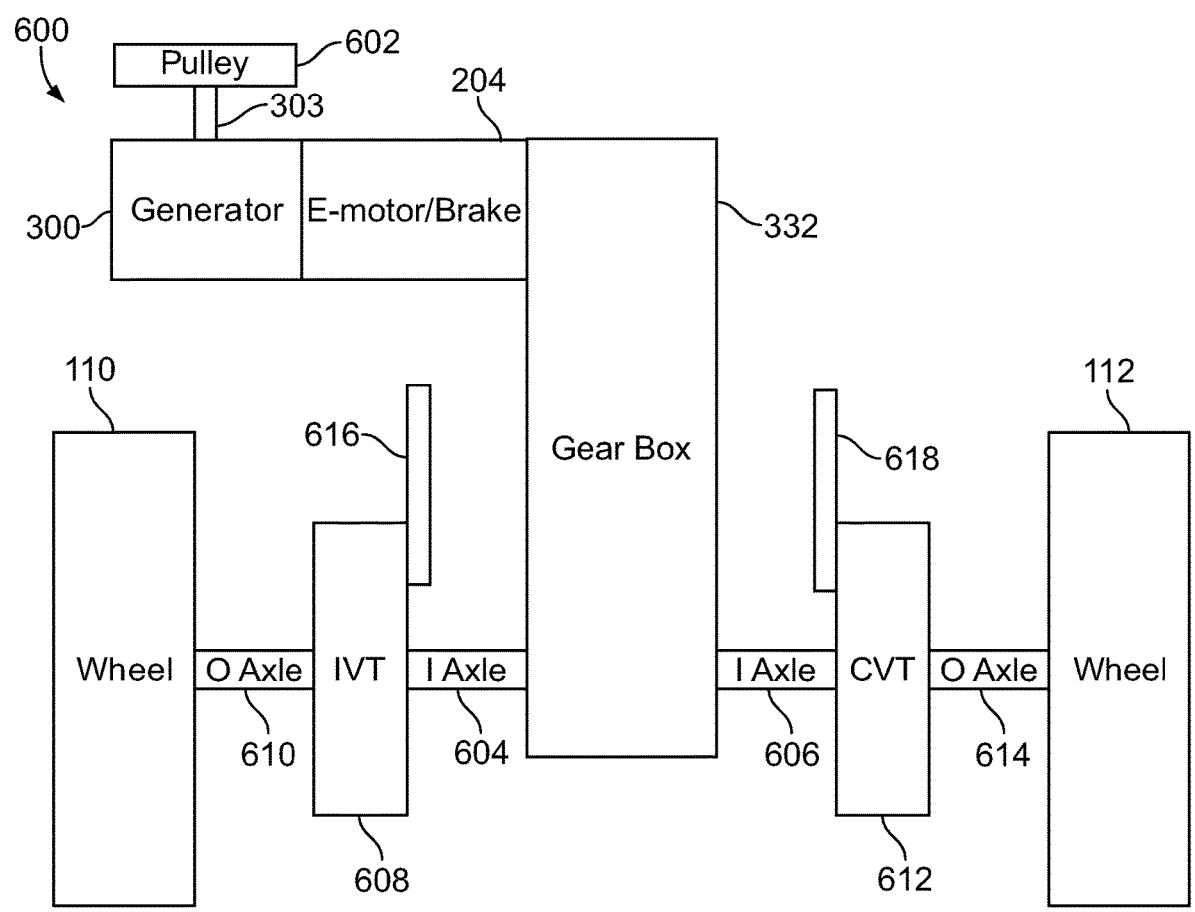
FIG. 6 illustrates a configuration of an electromechanical system for driving a mower, in accordance with an example implementation.

FIG. 6 illustrates a configuration of an electromechanical system 600 for driving the mower 100, in accordance with an example implementation. The configuration of the electromechanical system 600 can be used, for example, with the control system 301 where the electric motor 204 is used to control traction of both wheels 110, 112.

As depicted in FIG. 6, the engine 302 (not shown) can be coupled to the electric generator 300 via a pulley 602 and a chain or belt that transfers rotational power from the crank shaft of the engine 302 to the input shaft 303 of the electric generator 300. The electric generator 300 then provides power to drive the electric motor 204 as described above, and the electric motor 204 is coupled to the gear box 332.

The gear box 332 is coupled to and is configured to drive a first inner axle 604 and a second inner axle 606. The first inner axle 604 is coupled to a first planetary gear box 608, which in turn is coupled to a first outer axle 610. The first outer axle 610 is coupled to and is configured to drive the wheel 110. Similarly, the second inner axle 606 is coupled to a second planetary gear box 612, which in turn is coupled to a second outer axle 614. The second outer axle 614 is coupled to and is configured to drive the wheel 112.

In the configuration of FIG. 6, the engine 302 can be configured to be driven at a constant speed to drive the blade of the mower 100 at a desired speed, while the speeds of the wheels 110, 112 are decoupled from the speed of the engine 302. Particularly, the speeds of the wheels 110, 112 can be controlled by the voltage level at the DC voltage bus 206 and the duty cycle provided by the commutators 230, 320 as described above.

Additionally, the configuration of the gear box 332 also affects the speed of the wheels 110, 112. For example, the gear box 332 can be configured to provide a ten to one ratio such that the rotational speed of the electric motor 204 is reduced by a factor of ten while the torque is amplified by a factor of ten at the inner axles 604, 606.

Further, the speeds and direction of rotation of the wheels 110, 112 can be controlled by the planetary gear boxes 608, 612 that are respectively coupled to the wheels 110, 112 via the outer axles 610, 614. In an example, one or both of the planetary gear boxes 608, 612 can be configured as continuously variable transmissions (CVTs). A CVT, also known as a shiftless or step-less transmission, is configured as an automatic transmission that can change seamlessly through a continuous range of effective gear ratios. This contrasts with other mechanical transmissions that offer a fixed number of gear ratios. The flexibility of a CVT with suitable control can allow the inner axles 604, 606 to maintain a constant angular velocity even as the output speeds of the outer axles 610, 614 vary.

In another example, one or both of the planetary gear boxes 608, 612 can be configured as infinitely variable transmissions (IVTs). An IVT is a CVT configuration, in which the range of ratios of output shaft speed (speed of the outer axles 610, 614) to input shaft speed (speed of the inner axles 604, 606) includes a zero ratio that can be continuously approached from a defined "higher" ratio. A zero output speed ("low gear") with a finite input speed implies an infinite input-to-output speed ratio, which can be continuously approached from a given finite input value with an IVT. Herein, low gears are a reference to low ratios of output speed to input speed. This low ratio of IVTs can result in a "neutral," or non-driving "low" gear limit, in which the output speeds (at the outer axles 610, 614) are zero.

In FIG. 6 the planetary gear box 608 is labeled as an IVT and the planetary gear box is labelled as a CVT; however, it should be understood that either planetary gear box 608, 612 can be an IVT or a CVT.

The planetary gear boxes 608, 612 can be sized or configured to provide full power received from the gear box 332 to the wheels 110, 112. Further, the planetary gear boxes 608, 612 can be controlled via manual control levers or linkages. As depicted in FIG. 6, a lever 616 can be coupled to the planetary gear box 608 and a lever 618 can be coupled to the planetary gear box 612. The levers 616, 618 can be used by the operator to drive the planetary gear boxes 608, 612 and the wheels 110, 112 in forward, reverse, or neutral states.

In examples, brakes can be integrated into the planetary gear boxes 608, 612 to allow the operator to brake one or both of the wheels 110, 112. Notably, if the electric motor 204 is "off" such that its output shaft is not rotated, the wheels 110, 112 are placed in a locked state. As such, a parking mode can be added by allowing the operator to press a button or move a lever that causes the electric motor 204 to be placed in the "off" state to place the mower 100 in park mode.

Figure 7:
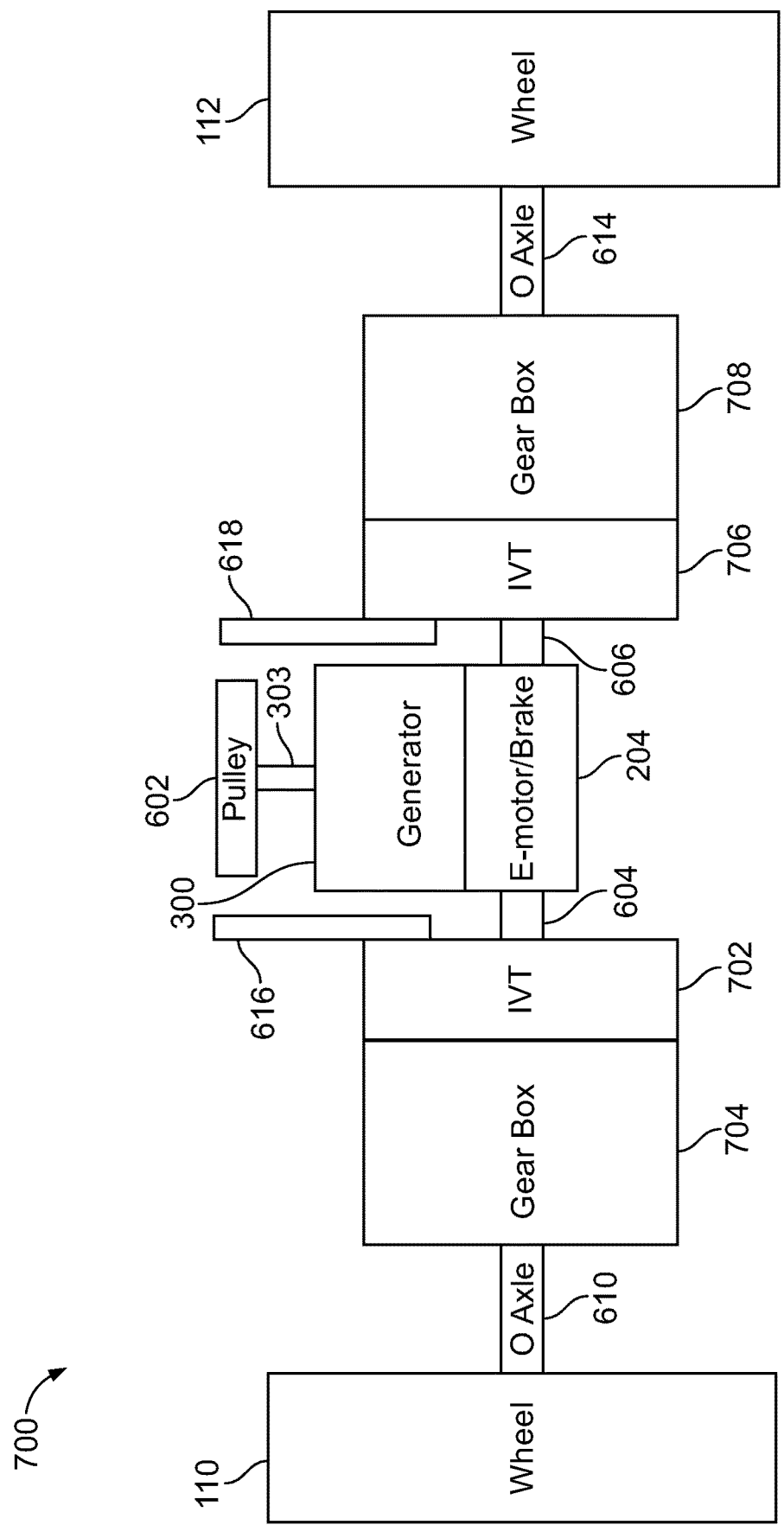
FIG. 7 illustrates another configuration of an electromechanical system for driving a mower, in accordance with an example implementation.

FIG. 7 illustrates another configuration of an electromechanical system 700 for driving the mower 100, in accordance with an example implementation. The configuration of the electromechanical system 700 varies from the configuration of the electromechanical system 600 in that the electromechanical system 700 does not include the gear box 332 that couples the electric motor 204 to the inner axles 604, 606. Rather, as shown in FIG. 7, the electric motor 204 is directly coupled to the inner axles 604, 606.

Further, the inner axle 604 is coupled to the outer axle 610 via a primary planetary gear box 702 (e.g., an IVT) coupled to a secondary planetary gear box 704. Similarly, the inner axle 606 is coupled to the outer axle 614 via a respective primary planetary gear box 706 (e.g., an IVT) coupled to a respective secondary planetary gear box 708.

In an example, with the configuration of electromechanical system 700, the primary planetary gear boxes 702, 706 can be sized to provide a fraction (e.g., one tenth) of the full power provided by the electric motor 204 and they can be controlled by the levers 616, 618 to move the wheels 110, 112 in forward, reverse, or neutral states. The secondary gear boxes 704, 708 can be configured to have a gear ratio of, for example, ten to one such that the rotational speeds of the output shafts of the primary planetary gear boxes 702, 706 are reduced by a factor of ten while the torques are amplified by a factor of ten at the outer axles 610, 614.

Figure 8:
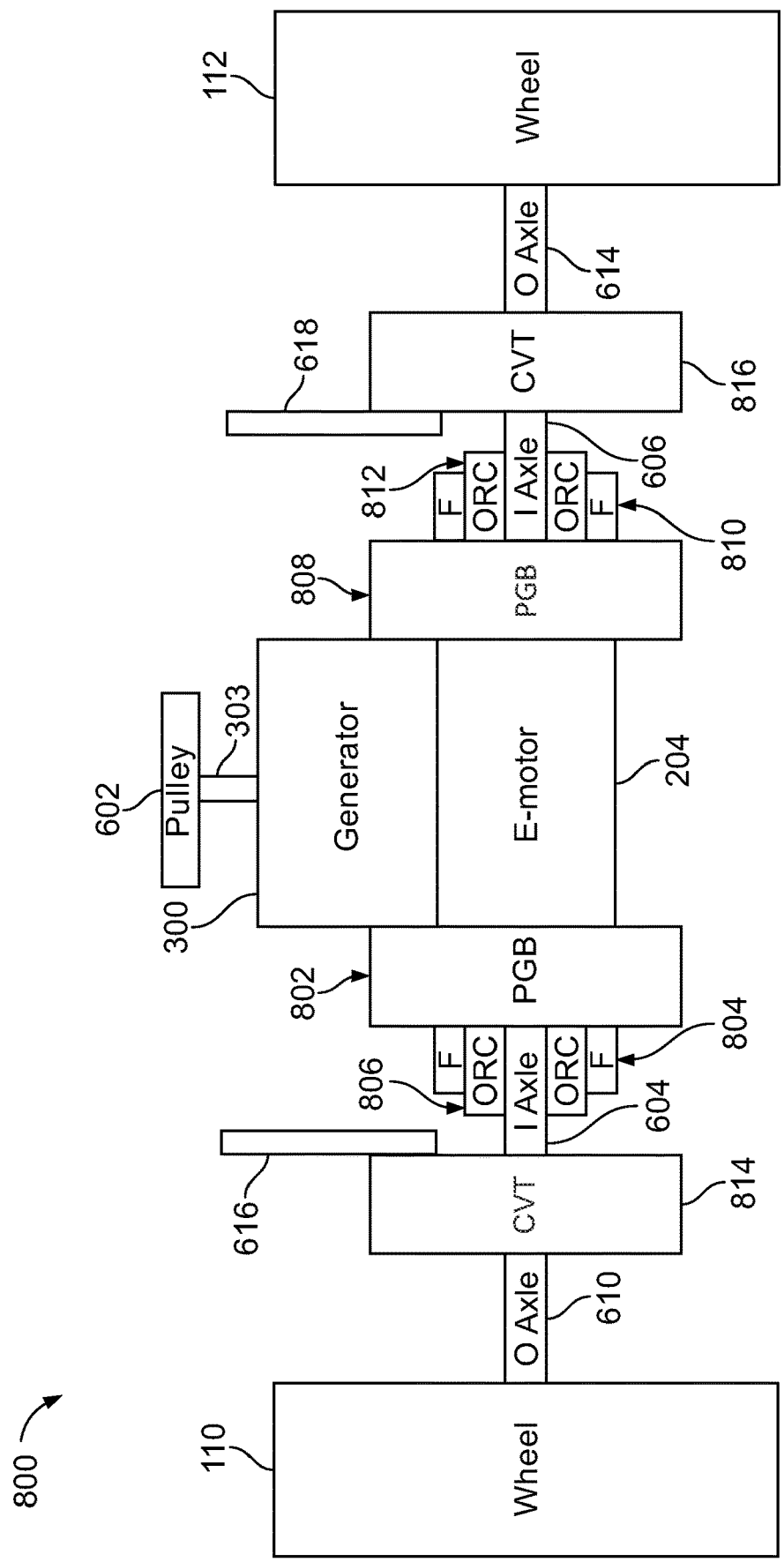
FIG. 8 illustrates another configuration of an electromechanical system for driving a mower, in accordance with an example implementation.

FIG. 8 illustrates another configuration of an electromechanical system 800 for driving the mower 100, in accordance with an example implementation. The electromechanical system 800 includes a primary planetary gear box 802 that is coupled to the inner axle 604 via a forward overrunning clutch 804 and a reverse overrunning clutch 806. As explained in details below with respect to FIGS. 9-10, the primary planetary gear box 802 can include a ring gear and a planetary carrier coupled to planet gears of the primary planetary gear box 802. The ring gear and the planetary carrier are capable of transmitting torque to the inner axle 604 in opposite directions.

In an example, the overrunning clutch 804 can be configured to allow locking between the planetary carrier and the inner axle 604 in one rotational direction, e.g., in forward rotation, while being free to rotate in the other rotational direction, e.g., reverse rotational direction. In this example, the reverse overrunning clutch 806 can be configured to allow locking between the ring gear and the inner axle 604 in the reverse rotational direction while allowing free rotation in the forward rotational direction. As such, the ring gear can transmit power to the inner axle 604 in the forward rotational direction, whereas the planetary carrier can transmit power to the inner axle 604 in the reverse direction.

In a similar manner, the electromechanical system 800 includes another primary planetary gear box 808 that is coupled to the inner axle 606 via a forward overrunning clutch 810 and a reverse overrunning clutch 812. The forward overrunning clutch 810 and the reverse overrunning clutch 812 can be configured similar to the forward overrunning clutch 804 and the reverse overrunning clutch 806, respectively.

Further, the inner axle 604 is coupled to the outer axle 610 via a secondary planetary gear box 814 (e.g., a CVT or IVT). Similarly, the inner axle 606 is coupled to the outer axle 614 via a secondary planetary gear box 816.

In examples, with the configuration of electromechanical system 800, the primary planetary gear boxes 702, 706 can be sized to have a ratio of ten to one. Further, as depicted in FIG. 8, the secondary planetary gear boxes 814, 816 are controlled by the levers 616, 618 to move the wheels 110, 112 in forward, reverse, or neutral states. The secondary planetary gear boxes 814, 816 can further be configured to compensate for difference in power between forward and reverse directions.

Figure 9:
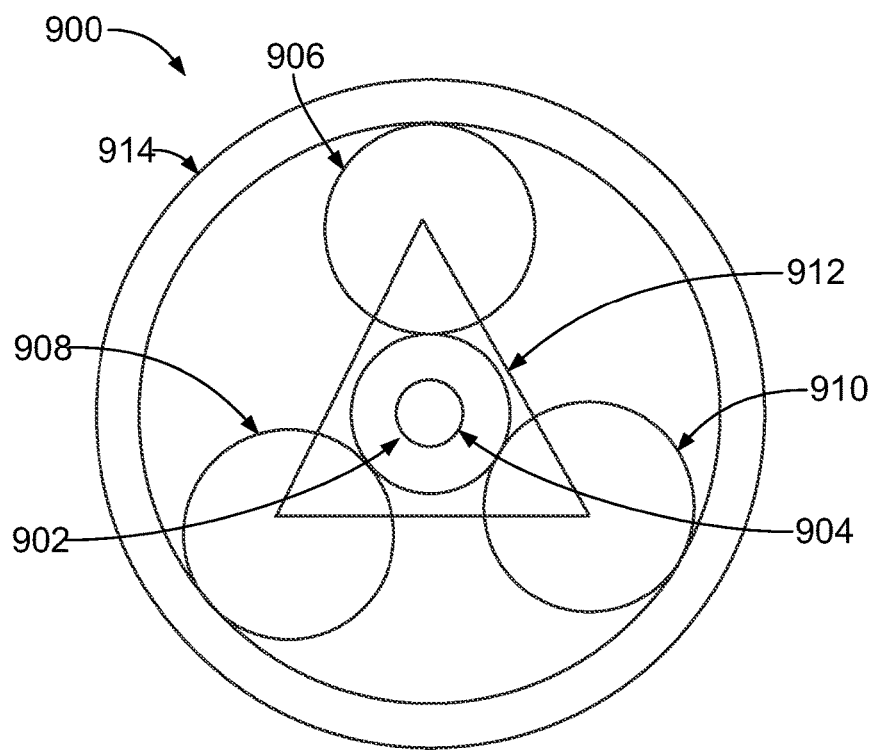
FIG. 9 illustrates a schematic representation of a planetary gear set, in accordance with an example implementation.

FIG. 9 illustrates a schematic representation of a planetary gear set 900, in accordance with an example implementation. The planetary gear set 900 can represent respective gear sets within any of the planetary gear boxes described in this disclosure (e.g., the planetary gear boxes described above with respect to FIGS. 6-8).

The planetary gear set 900 can include a sun gear 902 coupled to a shaft 904 (e.g., the inner axles 604, 606 or the outer axles 610, 614). The planetary gear set 900 can also include a plurality of planet gears such as first planet gear 906, second planet gear 908, and third planet gear 910. The planetary gear set 900 is configured such that the respective centers of rotation of the planet gears 906-910 revolve around the center of the sun gear 902.

The planetary gear set 900 can further include a planetary carrier 912 configured to couple the centers of the planet gears 906-910 to the center of the sun gear 902. The planetary carrier 912 can rotate, while carrying the planet gears 906-910 around the sun gear 902. Further, the planet gears 906-910 are configured to engage with inner teeth of a ring gear 914 such that the planet gears 906-910 can roll on a pitch circle of the ring gear 914. Example operations of the planetary gear set 900 are described next.

Figure 10:
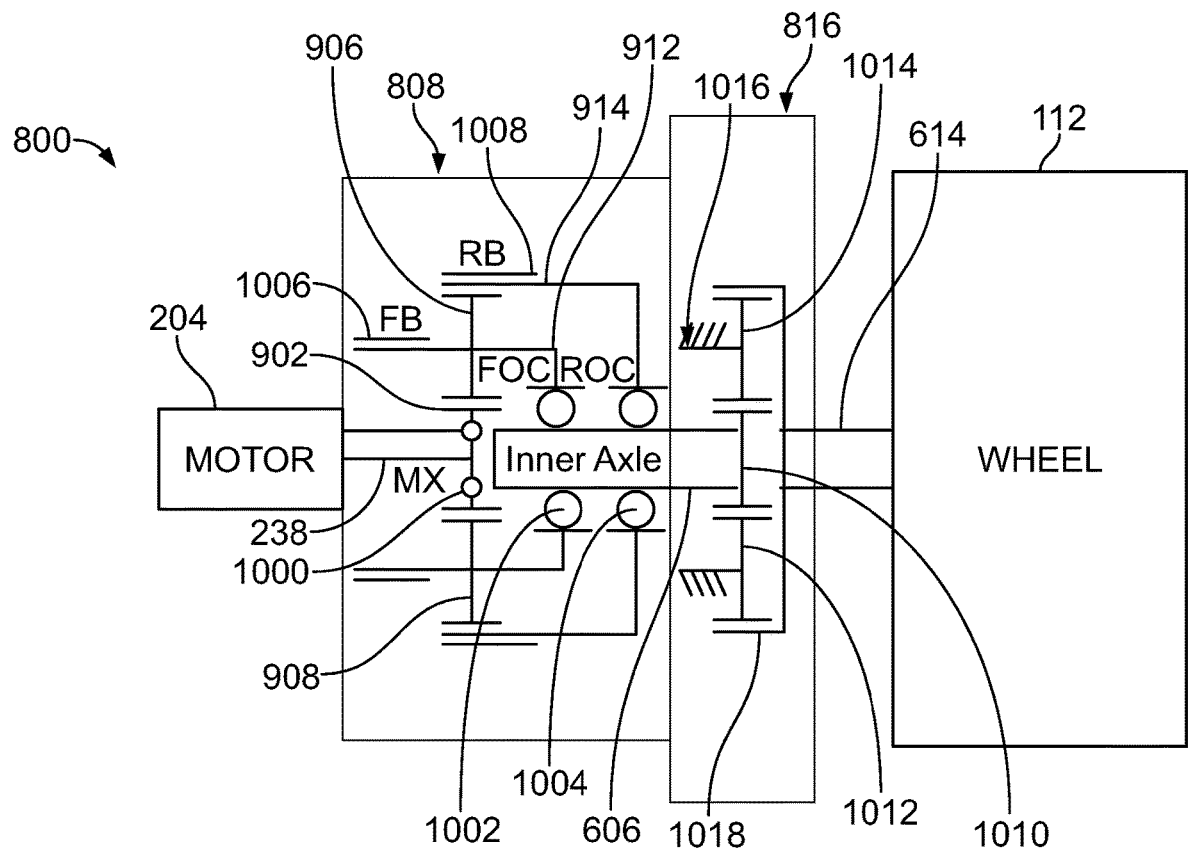
FIG. 10 illustrates a partial schematic representation of an electromechanical system depicting configuration of a primary planetary gear box and a secondary planetary gear box, in accordance with an example implementation.

FIG. 10 illustrates a partial schematic representation of the electromechanical system 800 depicting configuration of the primary planetary gear box 808 and the secondary planetary gear box 816, in accordance with an example implementation. The partial view shown in FIG. 10 illustrates transmission of motion from the electric motor 204 to the wheel 112. The electromechanical system 800 can be configured such that motion is transmitted from the electric motor 204 to the other wheel, e.g., the wheel 110, with a similar configuration. As such, a single electric motor (the electric motor 204) can drive both wheels 110, 112. Also, the primary planetary gear box 808 is assumed to have components of the planetary gear set 900 in addition to overrunning clutches and brakes as described below. Although the description below is provided with reference to the electromechanical system 800, the description can be applicable to the other systems described in this disclosure.

In the example implementation of FIG. 10, the output shaft of the electric motor 204, e.g., the output shaft 238 (or the shaft 904 described above), can be coupled to the sun gear 902 via a neutral overrunning clutch 1000. Generally, an overrunning clutch is a clutch that that permits a rotating member to turn freely under some conditions but not under others. Overrunning clutches can also be referred to as freewheel clutches as they are used to freewheel in one direction while driving in another direction of rotation. An overrunning clutch can be actuated mechanically or via an integrated solenoid.

The neutral overrunning clutch 1000 can have an integrated solenoid such that a command signal from a controller of the mower 100 can actuate the neutral overrunning clutch 1000. Particularly, when the lever 618 is in neutral, a command signal is sent to actuate the neutral overrunning clutch 1000, rendering the sun gear 902 isolated from rotation of the output shaft 238 (i.e., the sun gear 902 does not rotate with the output shaft 238). As such, the output shaft 238 can be rotating at full speed of the electric motor 204, while the sun gear 902 does not rotate as long as the neutral overrunning clutch 1000 is actuated. Once the neutral overrunning clutch 1000 is deactivated or unactuated, the sun gear 902 rotatably engages with the output shaft 238 and rotates therewith.

The electromechanical system 800 can further include a forward overrunning clutch 1002 that allows locking between the planetary carrier 912 and the output shaft 238 in reverse rotational direction while allowing free rotation of the planetary carrier 912 relative to the output shaft 238 in the forward rotational direction. The electromechanical system 800 can further include a reverse overrunning clutch 1004 that allows locking between the ring gear 914 and the output shaft 238 in the forward rotational direction, while allowing free rotation of the ring gear 914 relative to the output shaft 238 in the reverse rotational direction.

The electromechanical system 800 further includes a forward brake 1006 configured to engage with the planetary carrier 912 and a reverse brake 1008 configured to engage with the ring gear 914. In an example, the forward brake 1006 and the reverse brake 1008 can be placed in an actuated (braking) state to render the mower 100 stationary. In another example, the forward brake 1006 and the reverse brake 1008 can be modulated proportionally to control motion of the mower 100 and relative rotations of the wheels 110, 112.

In examples, the forward brake 1006 and the reverse brake 1008 can be band-type brakes. For instance, the forward brake 1006 can have a brake band about the planetary carrier 912, and brake band can be spring-loaded in an "on" or engaged state. In this case, the default state of the forward brake 1006 is to be engaged to brake the planetary carrier 912 associated with forward movement of the mower 100. This configuration can limit braking requirements of the planetary carrier 912 and can reduce wear of the forward brake 1006.

On the other hand, the reverse brake 1008 can be configured to have a brake band about the ring gear 914, where the brake band of the ring gear 914 is spring-loaded in an "off" or disengaged state. As such, the default state of the reverse brake 1008 is to remain disengaged until actuated. In an example, the reverse brake 1008 can additionally be manually actuated by an external lever to operate as a parking brake.

The configuration shown in FIG. 10 can allow operation in neutral, forward direction, and reverse direction. In neutral mode, the neutral overrunning clutch 1000 is actuated to isolate or decouple the sun gear 902 from the output shaft 238. Further, the brakes 1006, 1008 can be "on" or engaged if it is desirable to make the mower 100 stationary.

In forward motion mode, the lever 618 (see FIG. 8) can be moved in a forward actuation direction. In response, the controller of the mower 100 can unactuate the neutral overrunning clutch 1000 to lock the sun gear 902 to the output shaft 238 and allow transmission of torque to the primary planetary gear box 808. Further, the controller can release the reverse brake 1008 to release the ring gear 914 and allow it to rotate. The reverse overrunning clutch 1004 can be actuated to decouple the ring gear 914 from the inner axle 606, while the forward overrunning clutch 1002 can be unactuated to allow transmission of torque from the planetary carrier 912 to the inner axle 606.

In an example, the controller can be configured to maintain the reverse brake 1008 in a released state until there is equilibrium between the actual rotation speed of the outer axle 614 and the calculated or desired rotation speed of the outer axle 614. If the actual rotation speed deviates from the desired rotation speed of the outer axle 614, the controller can: (i) change the torque of the electric motor 204 to increase or decrease the torque or speed thereof, (ii) proportionally actuate or unactuate the forward brake 1006, or (iii) perform a combination of both changing the torque of the electric motor 204 and proportionally actuating or un-actuating the forward brake 1006 based on the operating conditions of the mower 100. In an example, closed-loop feedback control (e.g., a Proportional Integral Differential (PID) control loop) can be implemented by the controller to control speed of the mower 100 by modulating the actuation and un-actuation of the forward brake 1006, resulting in differing responses or differing modulation signal for the forward brake 1006 based on movement of the lever 618.

The lever 618 can then be returned back from the forward position to the neutral position. In response, the controller re-actuates the neutral overrunning clutch 1000 to disengage the sun gear 902 from the output shaft 238, precluding transmission of torque back to the output shaft 238. The controller can also actuate the forward brake 1006 and the reverse brake 1008 to brake both the planetary carrier 912 and the ring gear 914 and cause the wheel 112 to be in full brake state.

The lever 618 can then be moved in the reverse direction to operate the mower 100 in reverse motion mode. In response, the controller un-actuates the neutral overrunning clutch 1000 to allow torque to be transmitted from the output shaft 238 to the sun gear 902 and un-actuates the reverse overrunning clutch 1004 to allow torque to be transmitted from the ring gear 914 to the inner axle 606. The controller can then release the forward brake 1006 of the planetary carrier 912, while modulating engagement of the reverse brake 1008 to engage with the ring gear 914. As an example, a PID closed-loop feedback control can be implemented to modulate engagement of the reverse brake 1008.

The lever 618 can then be returned back from the forward position to the neutral position. In response, the controller can stop the electric motor 204 and/or re-actuate the neutral overrunning clutch 1000 to disengage the sun gear 902 from the output shaft 238, precluding transmission of torque back to the output shaft 238. The controller can also actuate the forward brake 1006 and the reverse brake 1008 to brake both the planetary carrier 912 and the ring gear 914 and cause the wheel 112 to be in full brake state.

As shown in FIG. 10, the secondary planetary gear box 816 is configured to transmit motion and torque between the inner axle 606 and the outer axle 614. In the example configuration shown in FIG. 10, the secondary planetary gear box 816 can include a sun gear 1010 coupled to the inner axle 606 and configured to engage with planet gears 1012, 1014.

The secondary planetary gear box 816 can further include a planetary carrier 1016 configured to couple the centers of the planet gears 1012-1014 to the center of the sun gear 1010. As depicted schematically in FIG. 10, the planetary carrier 1016 of the secondary planetary gear box 816 is "grounded" or maintained stationary. Further, the planet gears 1012, 1014 are configured to engage with inner teeth of a ring gear 1018 that is coupled to the outer axle 614. With this configuration, as the sun gear 1010 rotates, torque is transmitted to the planet gears 1012, 1014. Because the planetary carrier 1016 is stationary, the torque is then transmitted to the ring gear 1018, which rotates, thereby causing the outer axle 614 and the wheel 112 to rotate.

Figure 11:
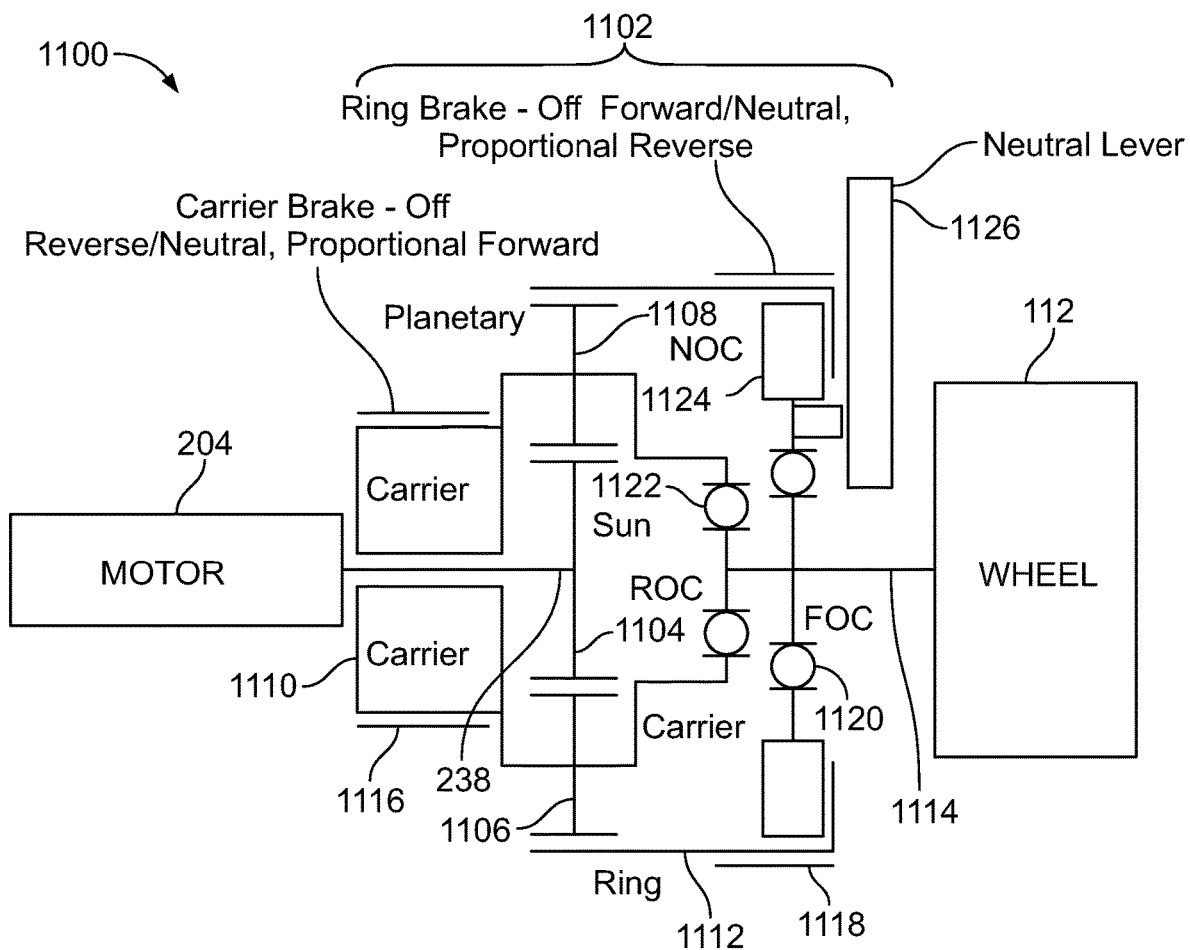
FIG. 11 illustrates a partial schematic representation of an electromechanical system depicting an alternative configuration for a planetary gear box configured to drive a wheel of a mower, in accordance with an example implementation.

FIG. 11 illustrates a partial schematic representation of an electromechanical system 1100 depicting an alternative configuration for a planetary gear box 1102 configured to drive the wheel 112 of the mower 100, in accordance with an example implementation. The partial view shown in FIG. 11 illustrates transmission of motion from the electric motor 204 to the wheel 112. The electromechanical system 1100 can be configured such that motion is transmitted from the electric motor 204 to the other wheel, e.g., the wheel 110, with a similar configuration. As such, a single electric motor (the electric motor 204) can drive both wheels 110, 112.

Rather than having a primary gear box coupled to an inner axle and a secondary gear box coupled to an outer axle, in the configuration shown in FIG. 11, one gear box, e.g., the planetary gear box 1102 is used to drive one axle, coupled to the wheel 112. The planetary gear box 1102 includes a sun gear 1104 coupled to the output shaft 238 of the electric motor 204. The planetary gear box 1102 can also include a plurality of planet gears such as planet gear 1106 and planet gear 1108 engaging with the sun gear 1104.

The planetary gear box 1102 can further include a planetary carrier 1110 configured to couple the centers of the planet gears 1106, 1108 to the center of the sun gear 1104. The planetary carrier 1110 can rotate, while carrying the planet gears 1106, 1108 around the sun gear 1104. Further, the planet gears 1106, 1108 are configured to engage with inner teeth of a ring gear 1112 such that the planet gears 1106, 1108 can roll on a pitch circle of the ring gear 1112.

The planetary carrier 1110 and the ring gear 1112 can be coupled to an axle 1114 that is coupled to, and configured to drive, the wheel 112. In operation, the planetary carrier 1110 or the ring gear 1112 can be locked to the axle 1114 to transmit power thereto while the other can be free to rotate without transmitting power to the axle 1114.

The planetary gear box 1102 can also include a carrier brake 1116 configured to brake the planetary carrier 1110 and a ring brake 1118 configured to brake the ring gear 1112. Further, the planetary gear box 1102 includes a forward overrunning clutch 1120 that can couple the ring gear 1112 to the axle 1114 to drive the axle 1114 in a forward direction, while allowing free rotation of the ring gear 1112 in the reverse direction. The planetary gear box 1102 also includes a reverse overrunning clutch 1122 that can couple the planetary carrier 1110 to the axle 1114 to drive the axle 1114 in a reverse direction, while allowing free rotation of the planetary carrier 1110 in the forward direction. The planetary gear box 1102 further includes a neutral overrunning clutch 1124 that can be operated based on position of a lever 1126. Particularly, the neutral overrunning clutch 1124 can be actuated by the lever 1126 to allow the ring gear 1112 to rotate without applying torque to the axle 1114.

In operation, as the electric motor 204 provides power to the sun gear 1104, the power is transmitted via the planet gears 1106, 1108 to the planetary carrier 1110 or the ring gear 1112 based on respective states of the carrier brake 1116, the ring brake 1118, the forward overrunning clutch 1120, the reverse overrunning clutch 1122, and the neutral overrunning clutch 1124. In forward operation mode (i.e., to move the wheel 112 in forward direction by moving the lever 1126 forward), power is provided to the ring gear 1112, which then provides power to the wheel 112 via the axle 1114, while the planetary carrier 1110 is held fixed by the carrier brake 1116. Also, in the forward operation mode, the forward overrunning clutch 1120 and the neutral overrunning clutch 1124 are unactuated to allow the ring gear 1112 to transmit power to the axle 1114. In these states, full forward power can be provided to the wheel 112.

As the wheel 112 reaches a desired or commanded speed, the planetary carrier 1110 can be allowed to slip by slightly releasing the carrier brake 1116 (i.e., reducing the braking power of the carrier brake 1116) until equilibrium is reached. To increase the speed of the wheel 112, the carrier brake 1116 can be applied heavier to increase its grip on the planetary carrier 1110, and, to slow down the wheel 112, the carrier brake 1116 can be released further.

In reverse operation mode (i.e., to move the wheel 112 in reverse direction by moving the lever 1126 in reverse direction), power is provided to the planetary carrier 1110, which then provides power to the wheel 112 via the axle 1114, while the ring gear 1112 is held fixed by the ring brake 1118. In the reverse operation mode, the reverse overrunning clutch 1122 and the neutral overrunning clutch 1124 are unactuated to allow the planetary carrier 1110 to transmit power to the axle 1114. In these states, full reverse power can be provided to the wheel 112. Similar to using the carrier brake 1116 to vary power to the ring gear 1112 in the forward operation mode, the ring brake 1118 can be used to vary the power to the planetary carrier 1110.

With this configuration, the carrier brake 1116 and the ring brake 1118 can be modulated to change power provided to the wheels 110, 112. In an example, position of the lever 1126 can determine a desired speed signal that the controller of the mower 100 can compare to information provided from a speed sensor to adjust the brake pressures of the carrier brake 1116 and the ring brake 1118.

To operate the mower 100 in neutral operation mode, the lever 1126 is placed in neutral position so as to activate or actuate the neutral overrunning clutch 1124, thereby allowing the ring gear 1112 to rotate without applying torque to the axle 1114.

Figure 12:
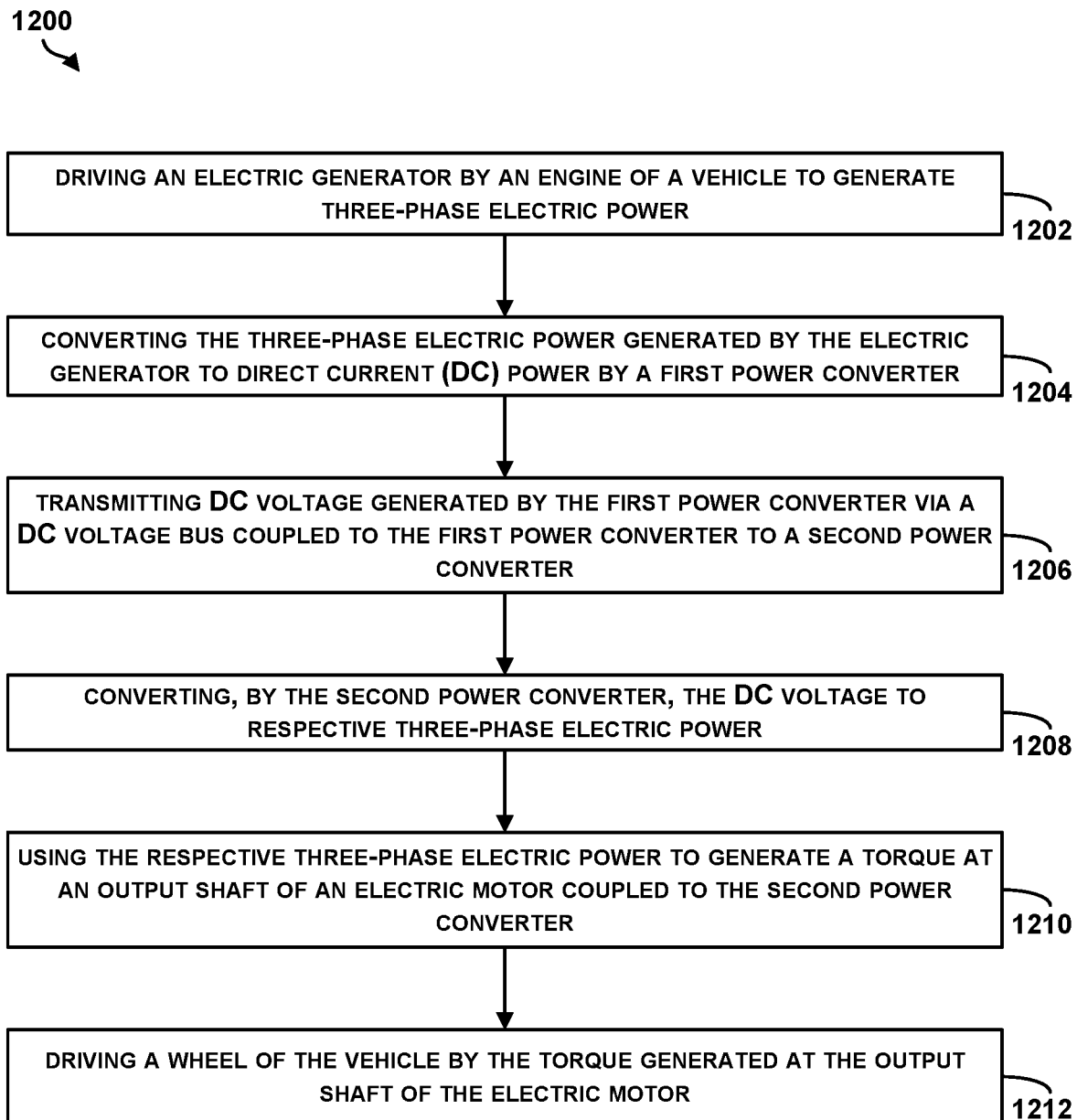
FIG. 12 is a flowchart of a method for operating a vehicle, in accordance with an example implementation.

FIG. 12 is a flowchart of a method 1200 for operating a vehicle, in accordance with an example implementation. The method 1200 can, for example, be used with the mower 100 described above.

The method 1200 may include one or more operations, or actions as illustrated by one or more of blocks 1202-1212. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1202, the method 1200 includes driving the electric generator 300 by the engine 302 of a vehicle, e.g., the mower 100, to generate three-phase electric power.

At block 1204, the method 1200 includes converting the three-phase electric power generated by the electric generator 300 to DC power by a first power converter, e.g., the power converter 304 or the passive rectifier 502.

At block 1206, the method 1200 includes transmitting DC voltage generated by the first power converter via the DC voltage bus 206 coupled to the first power converter (e.g., the power converter 304 or the passive rectifier 502) to a second power converter, e.g., the power converter 202.

At block 1208, the method 1200 includes converting, by the second power converter (e.g., the power converter 202), the DC voltage to respective three-phase electric power.

At block 1210, the method 1200 includes using the respective three-phase electric power to generate a torque at the output shaft 238 of the electric motor 204 coupled to the second power converter (e.g., the power converter 202).

At block 1212, the method 1200 includes driving the wheel (e.g., one or both of the wheels 110, 112) of the vehicle (e.g., the mower 100) by the torque generated at the output shaft 238 of the electric motor 204.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A vehicle comprising:
   a source of direct current (DC) power;
   a DC voltage bus coupled to the source of DC power and configured to transmit DC voltage generated by the source of DC power;
   a power converter coupled to the DC voltage bus, wherein the power converter comprises a semiconductor switching matrix including a plurality of semiconductor switching elements configured to convert the DC voltage to three-phase electric power;
   an electric motor coupled to the power converter and configured to receive the three-phase electric power, thereby generating a torque at an output shaft of the electric motor;
   a commutator configured to receive a three-phase commutation feedback signal from the electric motor, and responsively generate respective activation signals for the plurality of semiconductor switching elements of the power converter; and
   a wheel coupled to the output shaft of the electric motor and configured to be driven by the torque generated at the output shaft of the electric motor.

2. The vehicle of claim 1, wherein the commutator is further configured to:
   receive a first signal indicative of a duty cycle for the respective activation signals; and
   receive a second signal indicative of a torque command to be generated at the output shaft of the electric motor, wherein the commutator is configured to generate the respective activation signals based on the first signal and the second signal.

3. The vehicle of claim 1, further comprising:
   a first primary planetary gear box coupled to the electric motor and having a first ring gear and a first planetary carrier;

a first inner axle coupled to first primary planetary gear box, wherein the first primary planetary gear box further comprises: (i) a first overrunning clutch configured to engage the first ring gear to the first inner axle, and (ii) a second overrunning clutch configured to engage the first planetary carrier with the first inner axle;
a first secondary planetary gear box coupled to the first inner axle; and
a first outer axle coupled to the first secondary planetary gear box and coupled to the wheel.

4. The vehicle of claim 3, wherein the wheel is a first wheel, and wherein the vehicle further comprises:
a second wheel;
a second primary planetary gear box coupled to the electric motor and having a second ring gear and a second planetary carrier;
a second inner axle coupled to second primary planetary gear box, wherein the second primary planetary gear box further comprises: (i) a third overrunning clutch configured to engage the second ring gear with the second inner axle, and (ii) a fourth overrunning clutch configured to engage the second planetary carrier with the second inner axle;
a second secondary planetary gear box coupled to the second inner axle; and
a second outer axle coupled to the second secondary planetary gear box and coupled to the second wheel.

5. The vehicle of claim 3, wherein the first primary planetary gear box further comprises:
a sun gear coupled to the output shaft of the electric motor; and
a neutral overrunning clutch configured to engage the sun gear with the output shaft of the electric motor.

6. The vehicle of claim 3, wherein the first primary planetary gear box further comprises:
a ring brake configured to apply brake pressure to the first ring gear to control rotational speed of the first ring gear; and
a carrier brake configured to apply respective brake pressure to the first planetary carrier to control respective rotational speed of the first planetary carrier.

7. The vehicle of claim 3, wherein the first secondary planetary gear box comprises a respective planetary carrier and a respective ring gear, wherein the respective planetary carrier is stationary, wherein the respective ring gear is coupled to the first outer axle and configured do transmit torque thereto.

8. The vehicle of claim 1, further comprising:
a planetary gear box comprising: (i) a sun gear coupled to the output shaft of the electric motor, (ii) a plurality of planet gears engaging with the sun gear, (iii) a planetary carrier coupled to the plurality of planet gears, and (iv) a ring gear, wherein the plurality of planet gears are configured to engage with inner teeth of the ring gear;
an axle coupled to the wheel;
a forward overrunning clutch configured to engage the ring gear with the axle to drive the axle in a forward direction, while allowing free rotation of the ring gear in a reverse direction; and
a reverse overrunning clutch configured to engage the planetary carrier with the axle to drive the axle in the reverse direction, while allowing free rotation of the planetary carrier in the forward direction.

9. The vehicle of claim 8, further comprising:
a neutral overrunning clutch configured to allow the ring gear to rotate without applying torque to the axle when the neutral overrunning clutch is actuated.

10. The vehicle of claim 9, further comprising:
a lever configured to control the neutral overrunning clutch based on position of the lever.

11. The vehicle of claim 1, further comprising:
a DC bus capacitor configured to couple the DC voltage bus to electric ground.

12. A vehicle comprising:
a source of direct current (DC) power;
a DC voltage bus coupled to the source of DC power and configured to transmit DC voltage generated by the source of DC power;
a power converter coupled to the DC voltage bus, wherein the power converter comprises a semiconductor switching matrix including a plurality of semiconductor switching elements configured to convert the DC voltage to three-phase electric power;
a first electric motor coupled to the power converter and configured to receive the three-phase electric power, thereby generating a torque at an output shaft of the first electric motor;
a commutator configured to receive a three-phase commutation feedback signal from the first electric motor, and responsively generate respective activation signals for the plurality of semiconductor switching elements of the power converter;
a first wheel coupled to the output shaft of the first electric motor and configured to be driven by the torque generated at the output shaft of the first electric motor;
a respective power converter coupled to the DC voltage bus and configured to convert the DC voltage to respective three-phase electric power;
a second electric motor coupled to the respective power converter and configured to receive the respective three-phase electric power, thereby generating a respective torque at a respective output shaft of the second electric motor; and
a second wheel coupled to the respective output shaft of the second electric motor and configured to be driven by the respective torque generated at the respective output shaft of the second electric motor.

13. The vehicle of claim 12, further comprising:
a DC bus capacitor configured to couple the DC voltage bus to electric ground.

14. A vehicle comprising:
a source of direct current (DC) power;
a DC voltage bus coupled to the source of DC power and configured to transmit DC voltage generated by the source of DC power;
a power converter coupled to the DC voltage bus and configured to convert the DC voltage to three-phase electric power;
an electric motor coupled to the power converter and configured to receive the three-phase electric power, thereby generating a torque at an output shaft of the electric motor;
a wheel coupled to the output shaft of the electric motor and configured to be driven by the torque generated at the output shaft of the electric motor;
a gear box coupled to the electric motor;
a first inner axle coupled to the gear box;
a first planetary gear box coupled to the first inner axle; and a first outer axle coupled to the first planetary gear box and coupled to the wheel.

15. The vehicle of claim 14, wherein the wheel is a first wheel, and wherein the vehicle further comprises:
a second wheel;
a second inner axle coupled to the gear box;
a second planetary gear box coupled to the second inner axle; and
a second outer axle coupled to the second planetary gear box and coupled to the second wheel.

16. The vehicle of claim 14, wherein the power converter comprises a semiconductor switching matrix including a plurality of semiconductor switching elements, and wherein the vehicle further comprises:
a commutator configured to receive a three-phase commutation feedback signal from the electric motor, and responsively generate respective activation signals for the plurality of semiconductor switching elements.

17. The vehicle of claim 16, wherein the commutator is further configured to:
receive a first signal indicative of a duty cycle for the respective activation signals; and
receive a second signal indicative of a torque command to be generated at the output shaft of the electric motor, wherein the commutator is configured to generate the respective activation signals based on the first signal and the second signal.

18. A vehicle comprising:
a source of direct current (DC) power;
a DC voltage bus coupled to the source of DC power; and configured to transmit DC voltage generated by the source of DC power;
a power converter coupled to the DC voltage bus and configured to convert the DC voltage to three-phase electric power;
an electric motor coupled to the power converter and configured to receive the three-phase electric power, thereby generating a torque at an output shaft of the electric motor;
a wheel coupled to the output shaft of the electric motor and configured to be driven by the torque generated at the output shaft of the electric motor;
a first inner axle coupled to the electric motor;
a first planetary gear box coupled to the first inner axle;
a second planetary gear box coupled to the first planetary gear box; and
a first outer axle coupled to the second planetary gear box and coupled to the wheel.

19. The vehicle of claim 18, wherein the wheel is a first wheel, and wherein the vehicle further comprises:
a second wheel;
a second inner axle coupled to the electric motor;
a third planetary gear box coupled to the second inner axle;
a fourth planetary gear box coupled to the third planetary gear box; and
a second outer axle coupled to the fourth planetary gear box and coupled to the second wheel.

20. The vehicle of claim 18, wherein the power converter comprises a semiconductor switching matrix including a plurality of semiconductor switching elements, and wherein the vehicle further comprises:
a commutator configured to receive a three-phase commutation feedback signal from the electric motor, and responsively generate respective activation signals for the plurality of semiconductor switching elements, wherein the commutator is further configured to:
receive a first signal indicative of a duty cycle for the respective activation signals, and
receive a second signal indicative of a torque command to be generated at the output shaft of the electric motor, wherein the commutator is configured to generate the respective activation signals based on the first signal and the second signal.

\* \* \* \* \*